(12) United States Patent
Jun

(10) Patent No.: US 10,701,960 B2
(45) Date of Patent: Jul. 7, 2020

(54) METHOD FOR DISSOLVING CARBON DIOXIDE WITHOUT PRESSURIZING AND COOLING

(71) Applicant: Duk Jong Jun, Seoul (KR)

(72) Inventor: Duk Jong Jun, Seoul (KR)

( * ) Notice: Subject to any disclaimer, the term of this patent is extended or adjusted under 35 U.S.C. 154(b) by 0 days.

(21) Appl. No.: 15/798,410

(22) Filed: Oct. 31, 2017

(65) Prior Publication Data

US 2018/0042273 A1 Feb. 15, 2018

Related U.S. Application Data

(63) Continuation of application No. 14/236,503, filed as application No. PCT/KR2012/005995 on Jul. 27, 2012, now abandoned.

(30) Foreign Application Priority Data

Oct. 4, 2011 (KR) .................. 10-2011-0100655

(51) Int. Cl.
ㅤ*A23L 2/54*ㅤㅤ(2006.01)

(52) U.S. Cl.
ㅤCPC ............. *A23L 2/54* (2013.01); *A23V 2002/00* (2013.01)

(58) Field of Classification Search
ㅤCPC A23L 2/54; A47J 31/407; A47J 31/41; B65D 85/8043; B67D 1/0406; Y10S 261/07; Y10T 137/0385
ㅤSee application file for complete search history.

(56) References Cited

U.S. PATENT DOCUMENTS

| | | | |
|---|---|---|---|
| 1,912,439 A * | 3/1932 | Feller | A23C 9/1524 426/319 |
| 4,572,728 A | 2/1986 | Heichberger | |
| 4,592,911 A * | 6/1986 | Behr | B01D 11/0203 424/764 |
| 4,639,262 A | 1/1987 | Heichberger | |
| 5,124,088 A | 6/1992 | Stumphauzer | |
| 5,909,824 A | 6/1999 | Qian et al. | |
| 6,669,973 B1 | 12/2003 | Jolivet et al. | |
| 8,808,775 B2 * | 8/2014 | Novak | B01F 15/0206 426/394 |
| 2010/0009052 A1 | 1/2010 | Canessa et al. | |
| 2011/0226343 A1 * | 9/2011 | Novak | A23L 2/54 137/12.5 |
| 2013/0202747 A1 * | 8/2013 | Kopel | B65D 81/3211 426/115 |

FOREIGN PATENT DOCUMENTS

| | | |
|---|---|---|
| AU | 1275888 A | 6/1988 |
| JP | 2009-100705 A | 5/2009 |
| KR | 10-2000-0012692 A | 3/2000 |
| KR | 10-2000-0072329 A | 12/2000 |
| KR | 10-2011-0060138 A | 6/2011 |

OTHER PUBLICATIONS

Handbook of Food Science, Technology, and Engineering, vol. 1, Chapter 15, Carbonated Beverages, 2005, Taylor & Francis Group, LLC., pp. 1-18.*
The Phase Diagram for Carbon Dioxide by ChemicalLogic Corporation, http://www.chemicalogic.comIDocuments/co2_phase_diagram.pdf.1999.p. 1.

* cited by examiner

*Primary Examiner* — Tamra L. Dicus
(74) *Attorney, Agent, or Firm* — Revolution IP, PLLC

(57) ABSTRACT

Disclosed is a method for bottling a carbonated beverage in a container without causing overflow of the carbonated beverage or evaporation of carbon dioxide, the method including: placing a beverage composition without carbon dioxide in the container; introducing solid or liquid carbon dioxide to the beverage composition in the container to delay a change of vapor pressure in the container; and sealing the container before the introduced solid or liquid carbon dioxide is dissolved in the beverage composition, wherein a part of the introduced solid or liquid carbon dioxide in the sealed container becomes gas and the rest of the introduced solid or liquid carbon dioxide is dissolved in the beverage composition by pressure of the gas from the part of the introduced solid or liquid carbon dioxide without providing additional beverage composition, carbon dioxide and pressure in the container after sealing the container.

3 Claims, No Drawings

METHOD FOR DISSOLVING CARBON DIOXIDE WITHOUT PRESSURIZING AND COOLING

CROSS REFERENCE TO PRIOR APPLICATIONS

This application is a Continuation of U.S. patent application Ser. No. 14/236,503 filed Mar. 5, 2015, which is a National Stage Application of PCT International Patent Application No. PCT/KR2012/005995 filed Jul. 27, 2012, under 35 U.S.C. § 371, which claims priority to Korean Patent Application No. 10-2011-0100655 filed Oct. 4, 2011, which are all hereby incorporated by reference in their entirety.

BACKGROUND

The present invention relates to a method for introducing carbon dioxide for preparation of carbonated beverage and, more particularly, to a method for introducing carbon dioxide that involves placing a beverage composition having a temperature of 10 to 30° C. in a container, introducing solid or liquid carbon dioxide having a temperature of −78.5 to −5° C. to the beverage composition having a temperature of 10 to 30° C. in the container, and then sealing the container immediately after introduction of the carbon dioxide.

The carbonated beverage prepared by the method of introducing carbon dioxide for preparation of carbonated beverage according to the present invention has almost little change in the temperature and the saturated vapor pressure of the carbon dioxide, so the carbon dioxide has the saturated vapor pressure of approximately 1.0 atmospheric pressure, almost without causing overflow of the carbonated beverage or evaporation of the carbon dioxide.

Carbonated beverages are defined as a liquid for drinking that contains carbon dioxide dissolved in it, and their examples include soda drink, sparkling water, flavored soda drink, sparkling liquor, etc. First of all, the soda drink refers to a beverage that has carbon dioxide dissolved in a drinking water containing food or food additives (excluding colors and/or flavors). The sparkling water is a purified spring water that naturally contains carbon dioxide or has carbon dioxide dissolved in it. The flavored soda drink refers to a soda drink containing food additives (e.g., colors and/or flavors). The sparkling liquor means a fermented ethyl alcohol liquor containing carbon dioxide dissolved in it.

Unlike oxygen, carbon dioxide has an inhibitory performance on spontaneous combustion and thus can be used as an ingredient for a fire extinguisher to put out a fire. Carbon dioxide as used herein has a chemical formula of $CO_2$ and also refers to "carbonic acid" or "anhydrous carbonic acid". Carbon dioxide exists in the Earth's atmosphere at a concentration of about 0.03%. It is produced by combustion of carbon-containing substances, respiration of all living organisms, and so forth and emitted from erupting volcanoes. On the other hand, carbon dioxide is also consumed by plants during the process of carbonic acid assimilation. Thus the concentration of carbon dioxide in the air is almost constantly controlled. Carbon dioxide is an odorless and tasteless gas that has a boiling point of −78.5° C., a triple point of −56.6° C. at 5.2 atm, a critical temperature of 31.0° C., and a critical pressure of 72.80 atm. The volume of carbon dioxide dissolved in 1 L of water is 1.71 L at 0° C. and 0.44 L at 50° C. When dissolved in water, part of the dissolved carbon dioxide becomes $H_2CO_3$ or $HCO_3^-$, or $CO_3^{-2}$ which is acidic. The industrial uses of carbon dioxide are preparation of urea or sodium carbonate (soda ash) and preparation of solid carbonated beverages. As carbon dioxide inhibits the respiration of plants, it can be used for controlled atmospheric (CA) storage to extend the storage period of fruits and vegetables after the harvest. Carbon dioxide can also be used for removing astringency in tart persimmon fruits. Further, with the development of the supercritical gas extraction technique using carbon dioxide in the supercritical state as a solvent, carbon dioxide can be used in the preparation of decaffeinated coffee, the preparation of essential oils from spices, the extraction of γ-linoleinic acid from Oenothera odorata Jacquin, and so forth.

A general method for the process of introducing carbon dioxide to a beverage composition to prepare a carbonated beverage involves blending liquid carbon dioxide having a temperature of −30° C. to −5° C. and a beverage having a temperature of 10° C. to 30° C., placing the blend in a container, and sealing the container. To keep a large amount of carbon dioxide dissolved in the beverage, it is unavoidably necessary to lower the temperature of the unmixed beverage composition or keep the beverage composition under high pressure. Due to the saturated vapor pressure, this can cause creation/overflow of bubbles and evaporation of the carbon dioxide when pouring the beverage into a container.

SUMMARY

It is therefore an object of the present invention to provide a method for preparing a carbonated beverage that involves almost little change in the temperature and the saturated vapor pressure of the carbon dioxide even when a large amount of beverage is placed in a defined container and incorporated with a high content of carbon dioxide, thereby causing neither creation/overflow of bubbles from the beverage nor evaporation of the carbon dioxide.

It is another object of the present invention to provide a method for preparing a carbonated beverage that involves sealing the container kept under almost no saturated vapor pressure so as to fill the beverage up to the lid of the container, as a result of which the container, such as a bottle or a can, can be reduced to a size smaller than a usual beverage container size.

To achieve the above objects of the present invention, there is provided a method for introducing carbon dioxide to prepare a carbonated beverage that involves: placing a beverage composition having a temperature of 10° C. to 30° C. in a container; separately introducing solid or liquid carbon dioxide having a temperature of −78.5° C. to −5° C. to the beverage composition having a temperature of 10° C. to 30° C. in the container; and sealing the container right before the beverage composition and the carbon dioxide are mixed together.

There is also provided a method for introducing carbon dioxide to prepare a carbonated beverage that involves: placing a beverage composition having a temperature of 10° C. to 30° C. in a container; separately introducing liquid carbon dioxide having a temperature of −70.0° C. to −56.5° C. to the beverage composition having a temperature of 10° C. to 30° C. in the container; and sealing the container right before the beverage composition and the carbon dioxide are mixed together.

Further, the added amount of the carbon dioxide is 0.05 to 5 wt. % with respect to the total weight of the beverage composition.

The method for introducing carbon dioxide to prepare a carbonated beverage according to the present invention involves almost little change in the temperature and the saturated vapor pressure of the added carbon dioxide even when a large amount of beverage is put in a defined container and incorporated with a high content of carbon dioxide, thereby causing neither creation/overflow of bubbles from the beverage nor evaporation of the carbon dioxide during the sealing process. Further, the method involves sealing the container under almost no saturated vapor pressure, so the beverage can be filled almost up to the lid of the cd nta ner. This can reduce the container, such as a bottle or a can, to a size smaller than a usual beverage container size.

DETAILED DESCRIPTION

The present invention is directed to a method for introducing carbon dioxide to prepare a carbonated beverage. Preferably, the method includes placing a beverage composition having a temperature of 10° C. to 30° C. in a container, separately introducing solid or liquid carbon dioxide having a temperature of −78.5° C. to −5° C. to the beverage composition having a temperature of 10° C. to 30° C. in the container, and sealing the container right before the beverage composition and the carbon dioxide are mixed together.

More preferably, the method includes placing a beverage composition having a temperature of 10° C. to 30° C. in a container, separately introducing liquid carbon dioxide having a temperature of −70.0° C. to −56.5° C. to the beverage composition having a temperature of 10° C. to 30° C. in the container, and sealing the container right before the beverage composition and the carbon dioxide are mixed together.

In addition, the added amount of the carbon dioxide is 0.05 to 5 wt. % with respect to the total weight of the beverage composition.

The term "carbonated beverage" as used herein refers to a liquid for drinking that contains carbon dioxide, such as soda drink, sparkling water, flavored soda drink, sparkling liquor, and so forth.

The beverage composition having a temperature of 10° C. to 30° C. may be applied to all the beverage compositions generally used in the related art of the present invention.

Preferably, the beverage composition having a temperature of 10° C. to 30° C. may be prepared by mixing 3 to 30 wt. % of fruit granules, 5 to 10 wt. % of sugar, 0.05 to 3 wt. % of citric acid, 0.05 to 2 wt. % of vitamin C, and 65 to 90 wt. % of purified water.

The fruit granules refer to pieces of fruit pulverized to a size of 200 to 350 mesh and may include at least one selected from the group consisting of orange, tangerine, mango, coconut, grape, strawberry, water melon, peach, apple, pear, and persimmon.

Generally, in the case of introducing carbon dioxide to prepare a carbonated beverage, a liquid carbon dioxide having a temperature of −30° C. to −5° C. and a beverage having a temperature of 10° C. to 30° C. are well mixed and then placed into a container, which is then sealed to complete a carbonated beverage. In order to dissolve a large amount of the carbon dioxide in the beverage, it is unavoidably necessary to lower the temperature of the unmixed beverage composition or keep the beverage composition under high pressure. Thus, the saturated vapor pressure can cause creation/overflow of bubbles and evaporation of the carbon dioxide when pouring the beverage into a container.

Further, the saturated vapor pressure can be considerably lowered under poor conditions, including, such as, using an extremely large amount of the carbon dioxide, adding carbon dioxide having a temperature of −5° C. or above, or having an extension of the time of introducing the carbon dioxide.

Accordingly, the method for introducing carbon dioxide to prepare a carbonated beverage according to the present invention includes placing a beverage composition having a temperature of 10° C. to 30° C. in a container, separately introducing solid or liquid carbon dioxide having a temperature of −78.5° C. to −5° C. to the beverage composition having a temperature of 10° C. to 30° C. in the container right before sealing the container, and then sealing the container in 0.5 to 3 seconds immediately after introduction of the solid or liquid carbon dioxide in order not to allow a mixing of the beverage composition and the carbon dioxide. It is to be noted that said "0.5 to 3 seconds" is not exclusive and restrictive from the scope of the invention which is limited solely by the appended claims. This leads to almost little change in the temperature and the saturated vapor pressure of the carbon dioxide, making the saturated vapor pressure approximately 1.0 atm and causing neither creation/overflow of bubbles from the beverage nor evaporation of the carbon dioxide.

Further, the method allows it to introduce a desired amount of the carbon dioxide without a need for lowering the temperature of the beverage composition having a temperature of 10° C. to 30° C. Moreover, the container is sealed while it is kept under almost no saturated vapor pressure, so the beverage can be filled up to the lid of the container. This can reduce the container, such as a bottle or a can, to a size smaller than a usual beverage container size, or fill more of the beverage in the container.

In addition, another method of introducing carbon dioxide to prepare a carbonated beverage according to the present invention includes placing a beverage composition having a temperature of 10° C. to 30° C. in a container, introducing liquid carbon dioxide having a temperature of −70.0° C. to 55.5° C. to the beverage composition having a temperature of 10° C. to 30° C. in the container, and sealing the container right before the beverage composition and the carbon dioxide are mixed together. In this regard, the carbon dioxide has a melting point of −78.45° C. and a boiling point of −56.55° C. The liquid carbon dioxide having a temperature of −70.0° C. to −56.5° C. is introduced to the beverage composition having a temperature of 10° C. to 30° C. in the container. Compared to the case of using the solid or liquid carbon dioxide having a temperature of −78.5° C. to −5° C., this can lead to little change in the temperature and the saturated vapor pressure of the carbon dioxide and cause neither creation/overflow of bubbles from the beverage nor evaporation of the carbon dioxide in the preparation of a carbonated beverage.

The added amount of the carbon dioxide is 0.05 to 5 wt. % with respect to the total weight of the beverage composition, because this proportion is suitable to give the beverage composition its fizziness and fresh taste and thus meet the preference of the customers.

The added amount of the carbon dioxide less than 0.05 wt. % with respect to the total weight of the beverage composition cannot have an effect of having the bubbles of carbon dioxide float to the surface of the beverage in the container. On the other hand, the added amount of the carbon dioxide greater than 5 wt. % with respect to the total weight of the beverage composition renders the beverage composition bitter rather than refreshing, making the beverage not suitable for drinking.

Hereinafter, preferred embodiments of the present invention will be described in further detail with reference to the accompanying drawings. The present invention may, however, be embodied in many different forms and should not be construed as limited to the embodiments set forth herein. Rather, these embodiments are provided so that this disclosure will be thorough and complete, and fully convey the scope of the invention to those skilled in the art.

EXAMPLE 1

Carbonated Beverage Prepared by Method for Introducing Carbon Dioxide for Preparation of Carbonated Beverage According to Present Invention (Introducing Liquid Carbon Dioxide (−40° C.))

20 g of orange granules, 5 g of sugar, 1 g of citric acid, 1 g of vitamin C, and 73 g of purified water are blended to prepare a beverage composition having a temperature of 20° C. The beverage composition is placed in a container. To the beverage composition is introduced liquid carbon dioxide having a temperature of −40° C. in an amount of 3 wt. % with respect to the total weight of the beverage composition. The container is then sealed immediately after the introduction of the carbon dioxide.

EXAMPLE 2

Carbonated Beverage Prepared by Method for Introducing Carbon Dioxide for Preparation of Carbonated Beverage According to Present Invention (Introducing Liquid Carbon Dioxide (−60° C.))

20 g of orange granules, 5 g of sugar, 1 g of citric acid, 1 g of vitamin C, and 73 g of purified water are blended to prepare a beverage composition having a temperature of 20° C. The beverage composition is placed in a container. To the beverage composition is introduced liquid carbon dioxide having a temperature of −60° C. in an amount of 3 wt. % with respect to the total weight of the beverage composition. The container is then sealed immediately after the introduction of the carbon dioxide.

COMPARATIVE EXAMPLE 1

Carbonated Beverage Prepared by General Method for Introducing Carbon Dioxide for Preparation of Carbonated Beverage (Introducing Liquid Carbon Dioxide (−30° C.))

20 g of orange granules, 5 g of sugar, 1 g of citric acid, 1 g of vitamin C, and 73 g of purified water are blended to prepare a beverage composition having a temperature of 20° C. The beverage composition is blended with 3 wt. % of liquid carbon dioxide having a temperature of −30° C. with respect to the total weight of the beverage composition. The carbonated beverage thus prepared is placed in a container and then subjected to a sealing process after the container is filled.

COMPARATIVE EXAMPLE 2

Carbonated Beverage Prepared by General Method for Introducing Carbon Dioxide for Preparation of Carbonated Beverage (Introducing Liquid Carbon Dioxide (−5° C.))

20 g of orange granules, 5 g of sugar, 1 g of citric; acid, 1 g of vitamin C, and 73 g of purified water are blended to prepare a beverage composition having a temperature of 20° C. The beverage composition is blended with 3 wt. % of liquid carbon dioxide having a temperature of −5° C. with respect to the total weight of the beverage composition. The carbonated beverage thus prepared is placed in a container and then subjected to a sealing process after the container is filled.

EXPERIMENTAL EXAMPLE 1

Overflow of Beverage and Evaporation of Carbon Dioxide

A testing is performed to evaluate the carbonated beverages prepared by the method of introducing carbon dioxide for preparation of carbonated beverage according to the present invention (Examples 1 and 2) and the carbonated beverages prepared by the general method of introducing carbon dioxide for preparation of carbonated beverage (Comparative Examples 1 and 2) in regards to the overflow of beverage and the evaporation of carbon dioxide. The carbonated beverages are evaluated on a 1-to-5 rating scale: (1: too many bubbles; 2: many bubbles; 3: so-so; 4: less bubbles; and 5: few bubble). The evaluation results are presented in Table 1.

TABLE 1

|  | Overflow of beverage | Evaporation of carbon dioxide |
| --- | --- | --- |
| Example 1 | 5 | 4 |
| Example 2 | 5 | 5 |
| Comparative Example 1 | 3 | 2 |
| Comparative Example 2 | 3 | 2 |

As can be seen from Table 1, the carbonated beverages of Examples have higher scores than the carbonated beverages of Comparative Examples in both items of evaluation.

This implicitly shows that the carbonated beverages prepared by the method of introducing carbon dioxide for preparation of carbonated beverage according to the present invention have almost little change in the temperature and the saturated vapor pressure of the carbon dioxide even when a large amount of the beverage is put into a defined container, causing neither overflow of the beverage nor evaporation of the carbon dioxide.

The method of introducing carbon dioxide for preparation of carbonated beverages according to the present invention leads to almost little change in the temperature and the saturated vapor pressure of the carbon dioxide even when a large amount of the beverage is poured in a defined container and incorporated with a higher content of the carbon dioxide, thereby causing neither overflow of the beverage nor evaporation of the carbon dioxide, and it is thus can be usefully applied to the preparation of carbonated beverages with ease.

Further, the method of introducing carbon dioxide for preparation of carbonated beverages according to the present invention involves sealing the container under almost no saturated vapor pressure, allowing the beverage filled nearly up to the lid of the container. This can reduce the container, such as a bottle or a can, to a size smaller than a usual beverage container size.

What is claimed is:

1. A method of increasing a carbon dioxide amount of a beverage in a bottle or a can without causing overflow of the beverage or evaporation of the carbon dioxide, the method consisting of:

placing a beverage composition without carbon dioxide in the bottle or the can;

introducing solid or liquid form of carbon dioxide to the beverage composition in the bottle or the can to delay a change of vapor pressure in the bottle or the can, wherein an amount of the solid or liquid form of the carbon dioxide introduced is 0.05 to 5 wt % with respect to a total weight of the beverage composition; and sealing the bottle or the can before the introduced solid or liquid form of the carbon dioxide is completely dissolved in the beverage composition, wherein the bottle or the can is sealed in 3 seconds after introduction of the solid or liquid form of the carbon dioxide, wherein a part of the introduced solid or liquid form of the carbon dioxide in the sealed bottle or the can becomes gas during the introducing step and the rest of the introduced solid or liquid form of the carbon dioxide is dissolved in the beverage composition by pressure of the gas after the sealing step.

2. The method of claim 1, wherein the beverage composition placed in the bottle or the can has a temperature of 10° C. to 30° C.

3. The method of claim 1, wherein the solid or liquid form of the carbon dioxide introduced to the beverage composition has a temperature of −78.5° C. to −5° C.

* * * * *